United States Patent [19]

Anderson

[11] Patent Number: 4,543,699

[45] Date of Patent: Oct. 1, 1985

[54] APPARATUS FOR ASSEMBLING SLATTED VENETIAN BLINDS

[75] Inventor: Richard N. Anderson, Owensboro, Ky.

[73] Assignee: Hunter Douglas Industries B.V., Rotterdam, Netherlands

[21] Appl. No.: 551,200

[22] Filed: Nov. 14, 1983

[51] Int. Cl.[4] .............................................. B23P 19/04

[52] U.S. Cl. ...................................................... 29/24.5

[58] Field of Search ......................................... 29/24.5

[56] References Cited

U.S. PATENT DOCUMENTS

| | | | |
|---|---|---|---|
| 3,521,337 | 7/1970 | Peeters . | |
| 3,736,631 | 6/1973 | Edixhoven | 29/24.5 |
| 4,073,044 | 2/1978 | Edixhoven . | |
| 4,188,693 | 2/1980 | Edixhoven . | |

*Primary Examiner*—Howard N. Goldberg
*Assistant Examiner*—Steven Nichols
*Attorney, Agent, or Firm*—Pennie & Edmonds

[57] ABSTRACT

Apparatus, for positioning a venetian blind ladder cord (or the like) and for guiding the slats of a venetian blind between individual rungs of a multiple cord cross-rung, is described. Specifically, this apparatus applies a force to a rung of a non-active cross-rung in a direction opposite to that in which the ladder cord advances and provides an abutment surface that engages with the bottom surface of an interlaced slat in order to support the slat form below. This, in turn, holds the active cross-rung in a fixed position against the force urging the rung downward and thus advantageously maximizes the opening (target) between the individual rungs of the active cross-rung. Furthermore, this abutment surface resiliently moves in a substantially perpendicular direction transverse to the direction in which the ladder cord advances so as to readily permit an assembled slat to advance, while advantageously reducing the likelihood that a heavy slat load will be dumped.

17 Claims, 6 Drawing Figures

FIG. 1
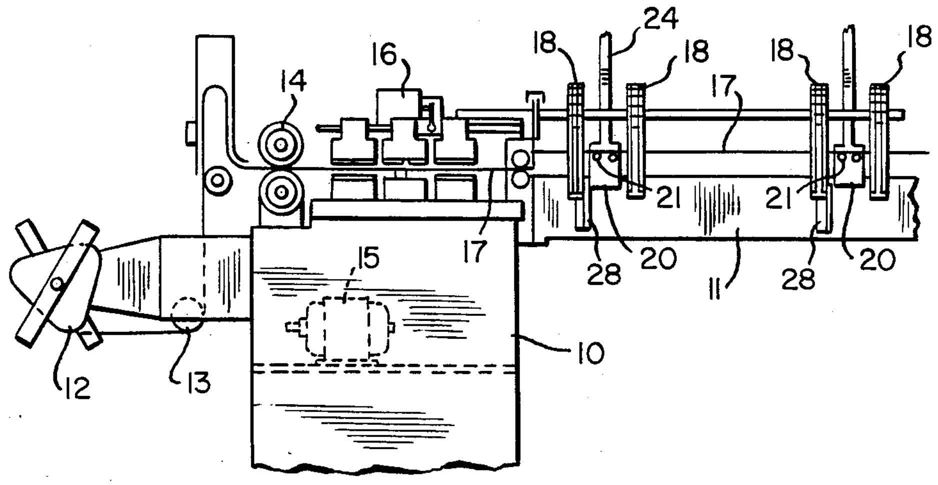
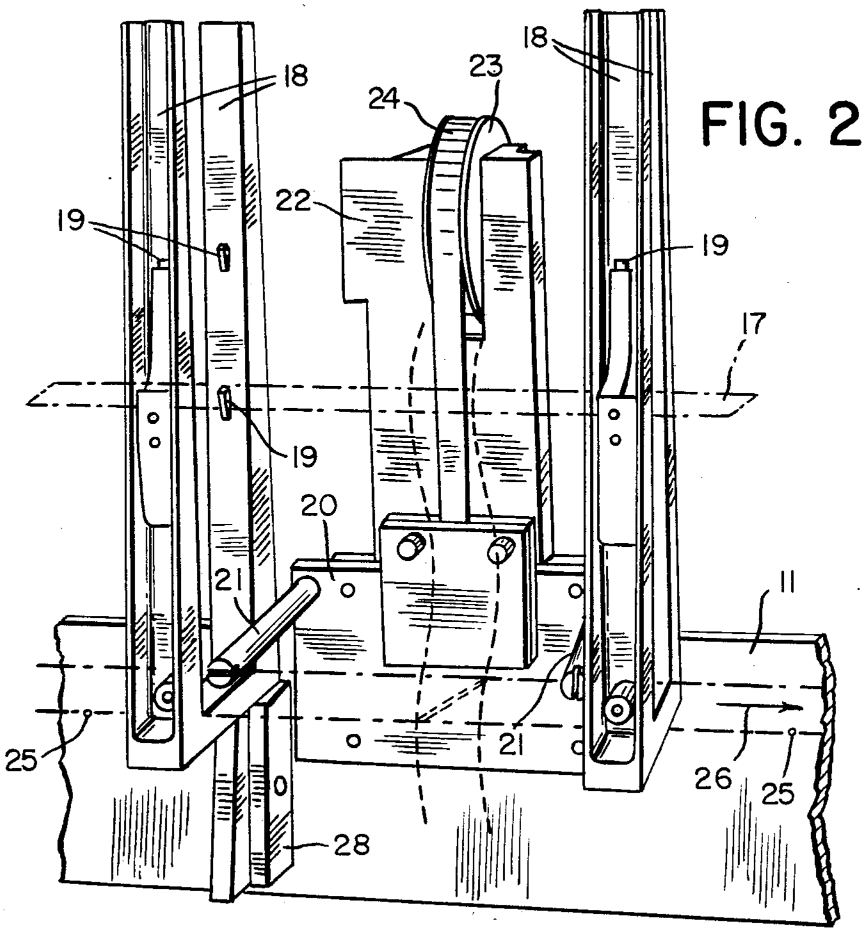
FIG. 2

APPARATUS FOR ASSEMBLING SLATTED VENETIAN BLINDS

FIELD OF THE INVENTION

The present invention relates to apparatus for assembling venetian blind slats in ladder cords (or the like) and to apparatus both for positioning a venetian blind ladder cord and for guiding the slats of a venetian blind between individual cords of a cross-rung comprising at least two cords of the ladder cord.

BACKGROUND ART

Various proposals exist in the art for insertion of slats between the cords of the cross-rungs running between two side cords of a venetian blind ladder cord (or the like). These proposals have usually involved some form of spreader which pulls the side cords apart and have generally included a guide which enables the slat material to be slid into place. Furthermore, some of the proposals involved angling the rungs with respect to the leading edge of the slat in order to facilitate entry of the leading edge of each slat between individual cords of a cross-rung.

Unfortunately, the spreaders known to the art have generally been unable to provide an optimal opening, i.e. the so-called "target," between the spread apart cords of a so called active cross-rung at the point where the slat is being inserted.

However, one proposal, disclosed in pending U.S. patent application entitled "Unit for Positioning a Venetian Blind Ladder and for Guiding the Slats of the Blind Thereonto", Ser. No 506,352, filed June 21, 1983 solves many of the problems associated with prior art spreaders. As described therein, a pair of adjacent cords are spread apart by means of a rotating pawl an an abutment plate carried by a torsion bar. The pawl exerts a downward force on a lower non-active rung, while the abutment surface exerts an upward force on the active cross-rung. Each slat is supported by a number of stops, each of which moves along a curved (arc-shaped) path. While this arrangement solves many of the problems associated with prior art designs and is thus perfectly satisfactory for inserting slats in ladder cords having a fairly wide spacing, this arrangement, due to the arc-shaped motion of the stops, may in some instances be susceptible to dumping a heavy slat load or performing incorrectly—particularly where the dimensional tolerances between the ladder cord and the slat are small, e.g. where close control ladder cords are used.

SUMMARY OF THE INVENTION

In accordance with the present invention, a unit, for positioning a venetian blind ladder cord (or the like) and for guiding slat material (or individual slats for a venetian blind) between individual cords of the cross rungs running between two side cords of the ladder cord, is provided which urges a non-active cross-rung in a direction opposite to that in which the ladder cord advances and has an abutment surface that abuttingly engages with the bottom surface of an assembled slat in order to support the slat from below and thereby hold the active cross-rung in a fixed position against a force urging it downward. This then maximizes the opening (target) between the individual cords of the active cross-rung. Furthermore, this abutment surface resiliently moves in a direction which is substantially perpendicular to the direction of ladder cord advance so as to readily permit an assembled (interlaced) slat to advance and also to substantially reduce the likelihood that a heavy slat load will be dumped.

Such a construction also advantageously enables the cross-rungs to be positioned very accurately. In particular, one of the cords of a cross-rung is readily located by the abutment surface in exactly the correct position relative to a slat guide element. Consequently, the slat is led straight into the target. In order to facilitate this, the abutment surface is located preferably at a distance downstream of the slat guide by an amount approximately equal to the spacing between adjacent slats. Since the abutment surface supports the active cross-rung (cord-pair) indirectly from above (by supporting the last interlaced slat from below) rather than supporting the active cross-rung directly, the active cross-rung cords are accurately and widely spread apart in order to provide a relatively large target, thereby ensuring accurate interlacing. Supporting the last interlaced slat, in accordance with the teachings of the present invention, also prevents the target from collapsing during interlacing. Advantageously, this, in turn, substantially decreases the number of mis-installed slats occurring during a production run thereby significantly increasing productivity.

Since a spreader constructed in accordance with invention produces a venetian blind in which the slats are firmly held in place both laterally and vertically, without, in many instances, the need to include any means to fix the slats in place, the present invention is particularly suitable for use with close tolerance ladder cords.

In addition, the specific embodiment disclosed herein includes at least one pawl which urges the ladder cord in a reverse direction. The pawl is resiliently engageable with a cross-rung upstream of the abutment. Preferably, a body portion has both a pawl and a spring mounted thereon. Each spring urges its respective pawl in such a cross direction so as to engage a rung, upstream of the abutment, and preferably at a location adjacent to the side cord which passes through the guide member on that body portion. This ensures that the reverse urging of the ladder cord is most effectively carried out.

While it is contemplated that only one resiliently moveable abutment and one slat guide are minimally necessary to achieve the desirous results discussed above, an abutment surface and a slat guide are preferably provided on each of two body portions.

While the abutment surfaces may be fixed, each abutment surface is preferably part of a resiliently retractable retaining member. Each retaining member preferably takes the form of two resiliently mounted vertical arms which are connected to an upper-cross member which, in turn, is secured to a frame. The lower end of each arm is connected to a moveable lower cross-member having an outwardly extending inclined surface below the abutment surface which, in its initial position, partially overlaps the path of an advancing slat. As the ladder cord is longitudinally advanced, movement of the last interlaced slat against the inclined surface causes the lower cross-member to retract in a direction outwardly tranverse to the tape. Once the slat clears the upper edge (i.e. the abutment surface) of the lower cross-member, this cross-member resiliently moves back to its original position. Once this occurs, the last interlaced slat is fully supported from below by the abutment surface of the retaining member. Advantageously, the upper cross-member of each retaining member incorporates a height adjustment which permits the amount of spreading, imparted to individual cords of the active cross-rung, to be set equal to the desired spacing between adjacent slats so as to facilitate accurate, easy slat interlacing using close control ladder cords.

Each guiding member may advantageously comprise a groove in a body portion and a spring-urged plate positioned to overlie the groove. The plate is spaced from the body portion by a distance sufficient to allow the passage of the cross-rungs, and the plate can be moved back against the spring action in order to expose the groove thereby enabling the side cords to be easily introduced into the grooves. Such a construction greatly facilitates the introduction of a new ladder cord into the unit.

Preferably, the guiding members are offset with respect to each other in the vicinity of the slat feed, so that the individual cords of a multiple cord cross-rung are inclined at an angle other than a right angle to the direction in which the slats are guided into the slat feed element. Since this configuration readily permits a corner of the slat, rather than its full leading edge, to be introduced first, a slat can be easily introduced between the spread apart rungs, of the active cross-rung.

BRIEF DESCRIPTION OF THE DRAWING

In order that the present invention may be readily understood, the following description is given, merely by way of example, with reference being made to the accompanying drawing in which:

FIG. 1 is a diagrammatic illustration of apparatus for mechanically producing venetian blinds;

FIG. 2 is a perspective view on a larger scale of one of the work stations of the apparatus shown in FIG. 1;

To facilitate easy understanding, the same reference numerals are used to denote those elements which are common to various figures.

DETAILED DESCRIPTION

Figure 3:
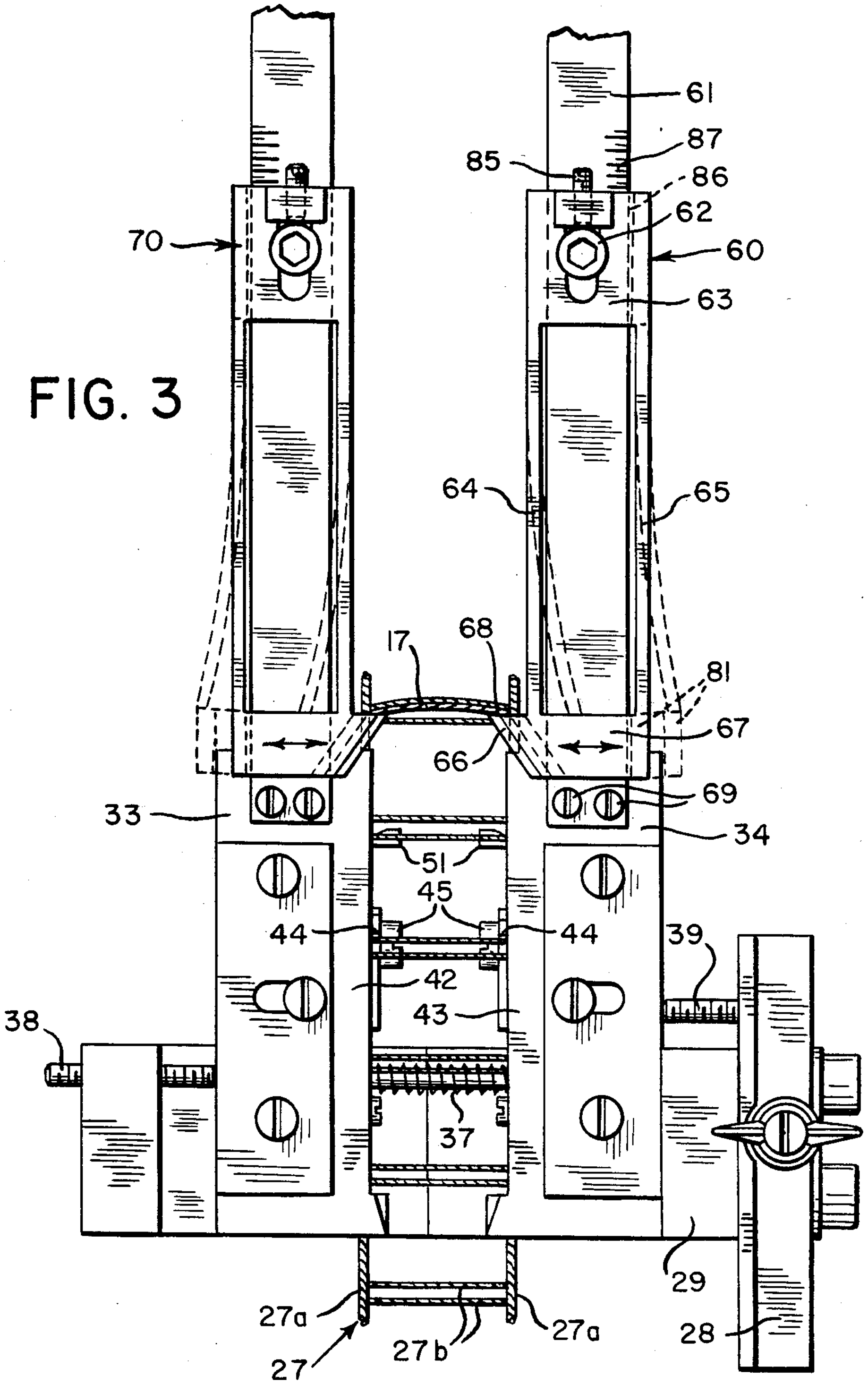
FIG. 3 is a front elevational view of a prefered embodiment of a positioning and guiding unit which incorporates the teachings of the present invention and which mounts into each work station shown in FIG. 1.

A portion of the apparatus for mechanically producing venetian blinds, as illustrated in FIG. 1, comprises machine bench 10 and assembly stand 11. Secured to machine bench 10 is supply drum 12 from which a sheet metal slat forming strip is fed. The strip passes over rollers 13 to a first pair of feed rolls 14 which are driven (through means not shown) by motor 15. The sheet metal slat forming strip then passes through device 16 which appropriately straightens and shapes the strips. Also, device 16 punches out the necessary orifices for affording passage to a lifting element for each slat and cuts the sheet metal strip to the required lengths for forming slats 17.

Assembly stand 11 comprises a plurality of work stations. The number of work stations depends upon particular requirements, especially upon the specific length and/or width of slat. In each work station, a ladder cord (or the like) which carries and guides several slats is assembled, and functions as a lifting element. The feeding of this ladder cord is not described, since it does not form part of the invention.

Associated with each work station, on assembly stand 11 shown in FIG. 2, are two vertical U-shaped holders 18, wherein the gap between two limbs that comprise each holder is slightly greater than the width of slat 17. Provided on the inner faces of holders 18 are resilient stops 19, which are arranged opposite each other in pairs and which, when slat 17 passes upwardly over them, pivot into the interior of holders 18 over a curved (arc-shaped) path. After slat 17 has passed through, stops 19 pivot back to their outwardly projecting position again, so that either slat 17, or a stack formed by a number of slats 17, can bear on the four stops associated with holders 18. In the present case, stops 19 can each be arranged at different levels on holders 18.

For the purpose of vertically moving individual slats 17 upward, use is made of two pins 21 secured to plate 20. Plate 20 is guided, in a manner not illustrated, by support 22, at the upper end of which is mounted roller 23. Belt 24, secured to the plate 20, passes over this roller so that plate 20, and with it pins 21, can be vertically raised or lowered by means of a drive, not illustrated.

The strip, from which slats 17 are cut, is guided by feed 25 which is illustrated by dash - dot lines in FIG. 2, and the direction of feed is indicated by arrow 26 which coincides with the direction of the longitudinal axis of the slats. However, in FIG. 2, the apparatus which embodies the principles of the present invention is not illustrated in detail, in order to enable the construction of a work station to be clearly shown.

It can be seen, from FIG. 3, that slats 17 are carried and guided by ladder cord 27 which comprises two side cords *27a*, and a series of double cord cross-rungs *27b* consisting of upper and lower rung members. The side cords *27a* are of a diameter that is greater than that of the upper and lower cords forming the cross-rungs *27b*. At this point, the apparatus shown in FIGS. 3–6, which embodies the principles of the present invention will now be discussed.

Specifically, this apparatus is secured to assembly stand 11 in the zone of ladder cord 27 and is used for inserting slats 17 between each pair of upper and lower cords of a cross-rung *27b* of ladder cord 27. The apparatus is preferably secured by means of retaining plate 28 on which the apparatus can be adjusted in the lateral and/or vertical directions. Extending transversely of retaining plate 28 is carrier plate 29, on which two body portions 33 and 34 are mounted via pivots 35 and 36, respectively. The two body portions are resiliently urged apart from one another by coil spring 37. Abutment screws 38 and 39 determine the maximum spacing occurring between these body portions.

Figure 4:
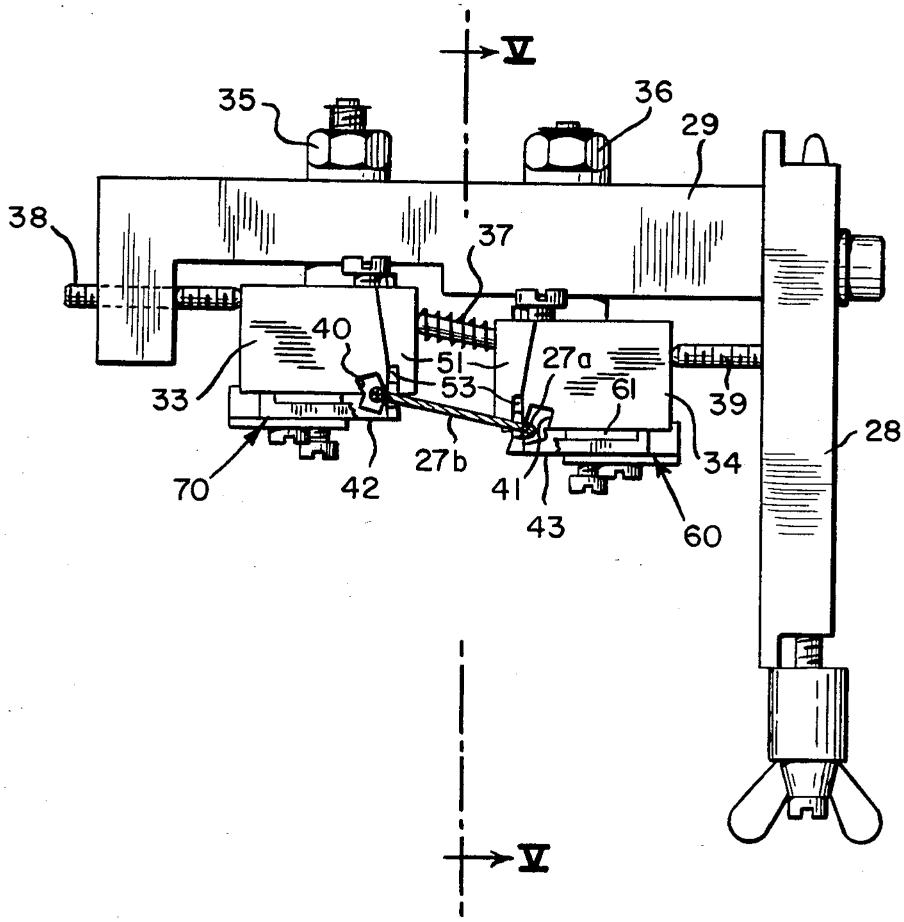
FIG. 4 is a plan view of the unit of FIG. 3.

As shown in FIG. 4, body portions 33 and 34 are provided with guiding grooves 40 and 41, respectively, each of which extends longitudinally of its respective body portion. Guide plates 42 and 43 are mounted to cover grooves 40 and 41, respectively, and each plate can be pulled back against the action of a spring (not shown) to expose its respective groove so that a respective side cord can be introduced into the groove. Thereafter, plates 42 and 43 are released so that the side cords of the ladder cord are held in place. There is a sufficient gap between the rear surface of plates 42 and 43 and their respective body portions in order to allow cross-rungs *27b* to pass between each plate and its body portion. Hence, this arrangement provides two longitudinally oriented substantially parallel ladder cord guiding members. Nonetheless, these ladder cord guiding members may slightly diverge from each other due to any outward force exerted by spring 37 on each body portion.

Figure 5:
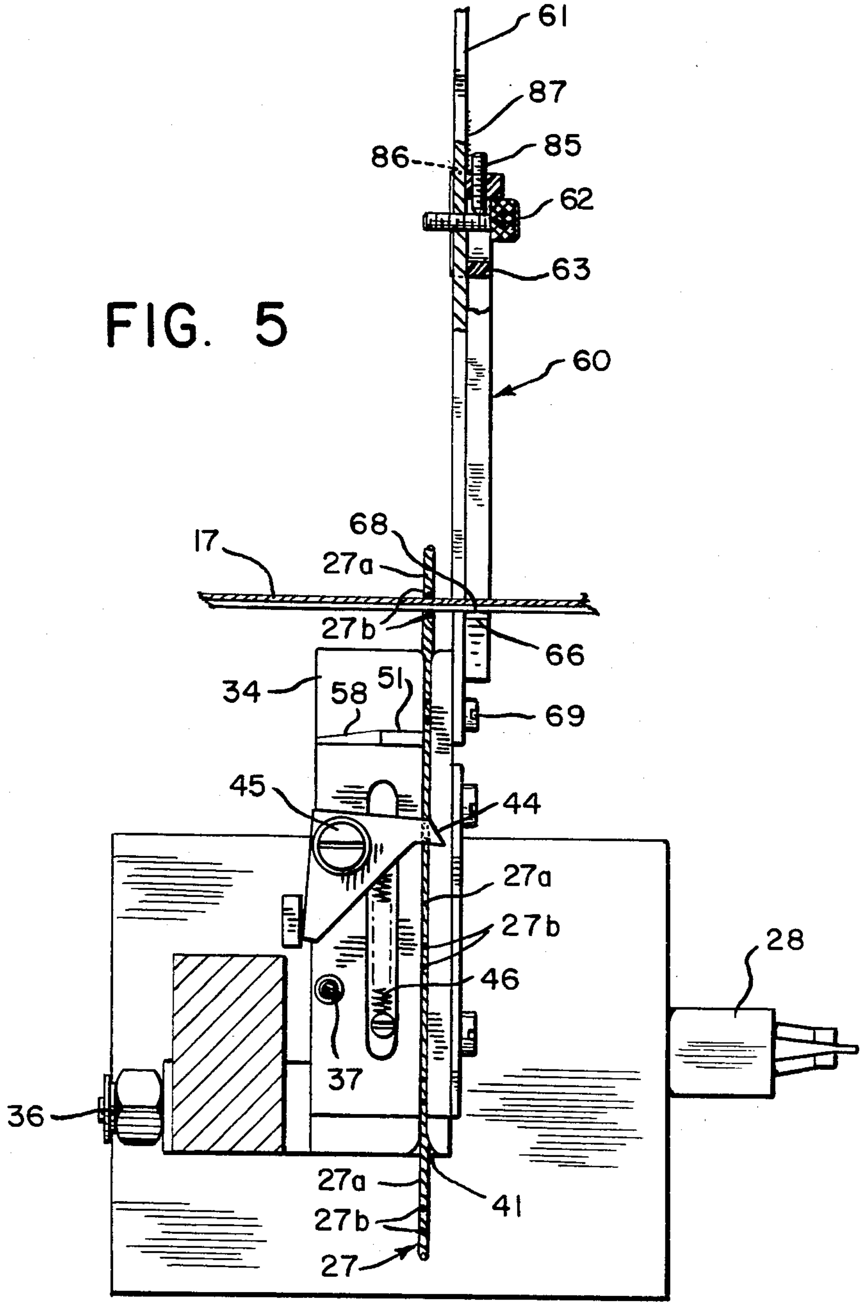
FIG. 5 is a sectional view taken along the line V—V of FIG. 4.
Figure 6:
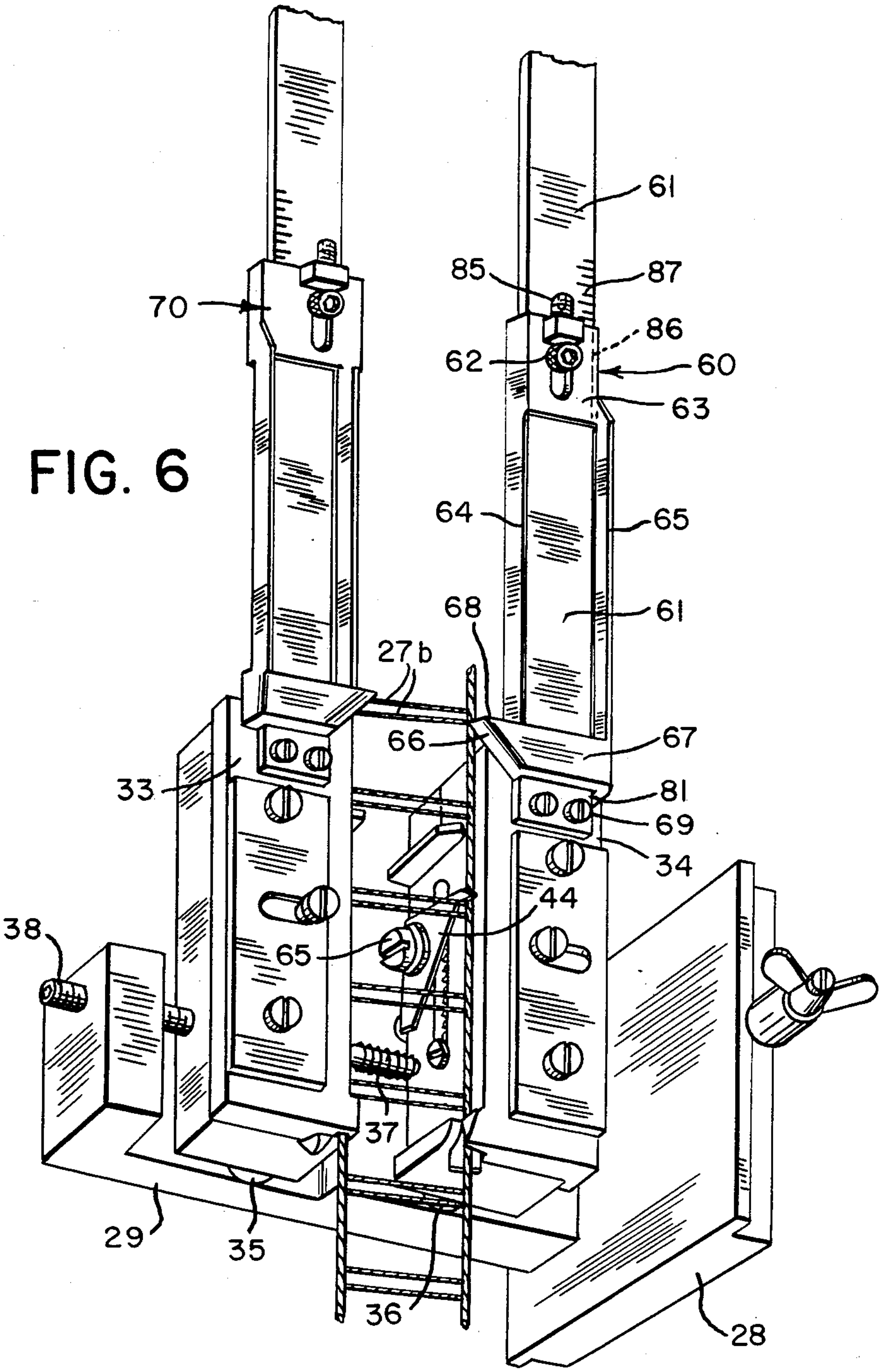
FIG. 6 is a perspective view of the unit shown in FIG. 3.

Each body portion has a pawl pivotally mounted thereon. As shown in FIGS. 5 and 6, pawl 44 is secured to body portion 34 by pivot pin 45 and urged, in a clockwise direction, by coil spring 46. Also mounted on each body member is a retaining member, such as retaining member 60 mounted on body portion 34 and retaining member 70 mounted on body portion 33 (see FIGS. 3 and 6). In FIG. 4, retaining members 60 and 70 are each shown in partial representation so as not to obscure guiding grooves 40 and 41 and all the parts associated therewith.

Because both retaining members function in an identical fashion, only the operation of retaining member 60 will now be described. Specifically, as shown in FIGS. 3 and 6, retaining member 60 is comprised of two resiliently mounted torsion arms 64 and 65 which are joined to upper and lower cross-members 63 and 67, respectively to form a quadrangle and more specifically a parallelogram. For optimum performance, these arms are preferably oriented as shown, i.e. in a substantially parallel configuration; however other (non-parallel) configurations will provide useful though probably non-optimum performance. Lower cross-member 67, is comprised of inclined edge 66 and abutment surface 68, and is free to move as indicated by the arrow, in a substantially perpendicular direction transverse to that of the longitudinal advance of ladder cord 27. The initial or original position of the lower cross-member is shown by solid lines, while its fully retracted position is shown by dashed lines. In its initial position, the lower cross-member partially overlaps the vertical path of an advancing slat. Movement of this cross-member, as described hereinbelow, is caused by the advancing longitudinal movement of each interlaced slat past inclined edge 66. Retaining stop 81 outwardly extends (preferably in parallel) from the right end surface of lower cross-member 67. This stop abuts against the right lower side surface of fixed support 61 in order to advantageously constrain the lower cross-member, and particularly inclined surface 68, from moving inwardly past its initial position. Upper cross-member 63 is secured to fixed support 61, by means of screw 62. This screw, when loosened, readily permits retaining member 60 to be longitudinally moved relative to support 61 and thus allows the height of abutment surface 68, relative to pawl 44, to be readily adjusted. The height is preferably set to provide the desired spacing between adjacent slats in order to facilitate accurate easy slat interlacing and is thus extremely useful when close (fine tolerence) control cords are used. Once the height has been adjusted using screw 62, vernier height adjustment screw 85 readily permits the height to be accurately adjusted to a fine resolution. Vernier scale 87 readily provides an indication of this height for future reference. Guiding edge 86 outwardly extends from upper cross-member 63. Because this guiding edge is situated in the same plane as is retaining stop 81—i.e. when the lower cross-member is in its initial position—and against the right side surface of fixed support 61, abutment surface 68 is always maintained in a substantially horizontal position, (i.e. perpendicular to the ladder cord) as its height is adjusted using screw 62 and vernier height adjustment screw 85. Fixed support 61 is fixedly secured to body portion 34 by means of screws 69. Advantageously, whenever retaining number 60 is in its initial position, it supports the active cross-rung from above by supporting the last interlaced slat from below. To minimize cost, both retaining members 60 and 70 are each integrally constructed, preferably from a suitable plastic. Slat guide 51 is comprised of upper surface 58 and has a slightly convex shape.

In use, the ladder cord is inserted into grooves 40 and 41, as described above, and is held in place by plates 42 and 43, respectively. The ladder cord can then be advanced upwardly, that is in a forward direction of movement. This occurs, as described above, through the longitudinal upward movement of pins 21 which, when raised, contact a slat and move the whole slat assembly upwardly (forwardly) in an intermittent manner. As the ladder cord advances, the last interlaced slat presses against inclined edge 66 of retaining number 60 and urges lower cross-member 67 to rearwardly retract, against the resilient action of arms 64 and 65, in a substantially perpendicular direction transverse to that in which the ladder cord advances. Once this slat clears (i.e. passes above) abutment surface 68, lower cross-member 67 immediately moves back to its initial position under the resilient action of arms 64 and 65 and then lies immediately below the last interlaced slat to support it. By this time, the next succeeding rung is engaged by pawl 44, which is urged downwardly by spring 46. Because of the action of the pawl on a non-active cross-rung which is immediately upstream of (i.e. below) the active cross-rung pair, i.e. the pair that is receiving a slat, a force is applied by the pawl to the lower portion of the ladder cord and urges this cord in the reverse direction, that is downwardly (rearwardly). Since abutment surface 68 functions to support the active cross-rung in a fixed position against the downwardly directed force exerted by pawl 44, the individual cords of the active cross-rung are, in turn, maximally spread apart thereby increasing the "target". Consequently, the slat can then be introduced, in the manner previously described, so that it accurately passes between the two rungs of the cords of the active spread apart cross-rung.

As can be readily appreciated by those skilled in the art, a positioning unit, embodying the teachings of the invention, advantageously ensures that the rungs are very accurately positioned prior to the slat material being introduced. Consequently, this not only permits very fine tolerance ladder cord (or the like) to be used, but also permits the installation of slats which are closely adapted to the spacing between both cords of each of the rungs and the side cords of the ladder cord. This advantageously ensures that the slats are held firmly in place, and also that the orientation of the slats is always maintained by the ladder cord. These advantageous results are particularly important and desirable whenever very thin and narrow slat material is to be used, such as that normally used between glass panes in a double or triple pane glazed window.

Furthermore, use of a positioning unit, embodying the teachings of the present invention, is not limited to only interlacing a slat between the threads of a cross-rung, but can also be used for assembling venetian blinds where a slat is merely positioned in the interspaces between adjacent cross-rungs. The positioning unit can be readily used in these latter applications by appropriately adjusting the height of the abutment surface. In addition, this unit could, for example, include the spring operated abutment and support mechanism disclosed in the previously noted pending U.S. patent application entitled "Unit for Positioning a Venetian Blind Ladder and for Guiding the Slats of the Blind Thereonto," Ser. No. 506,352 filed June 21, 1983.

While the abutment surface has been shown as being resiliently moved back to its natural position, other means readily apparent to those skilled in the art can be provided to move the abutment surface in sequence with the advancing movement of the ladder cord. Similarly, while pawls have been shown to provide the rearward urging of the ladder cord, other means are contemplated, for example, a weight hung on the ladder cord or the ladder cord being unwound from a spring-urged roller, that provide the same function as and thus can be substituted for the pawls.

In addition, each one of stops 19, which forms part of holders 18 as shown in FIG. 2, and, as previously described, functions to support an advancing slat, can be advantageously replaced by a retaining member similar to member 60, shown in FIGS. 3-6 and described above. In particular, each retaining member has a resiliently moveable cross-member having an inclined edge that projects outwardly from an inner surface of holder 18 (as do stops 19 shown in FIG. 2) to partially overlap the vertical path of an advancing slat. The cross-member also has an abutment surface, similar to surface 68 shown in FIG. 3, which is oriented substantially above the inclined edge. As a slat advances upward, the cross-member is resiliently urged into holder 18 by the advancing movement of the slat. Once the lower surface of the slat clears the abutment surface, the cross-member resiliently moves back to its initial position and, as a consequence, its abutment surface supports the advanced slat from below. Advantageously, these retaining members can be fabricated from fewer and less expensive parts than are required to fabricate stops 19. Also, these retaining members are advantageously much easier to mount, replace and adjust than are stops 19.

What is claimed is:

1. In a unit for positioning and guiding slat material for a venetian blind between individual cords of an active cross-rung extending between two side cords of a venetian blind ladder cord or the like, said unit comprising:

a body portion;

means secured to said body portion for resiliently urging a non-active cross-rung in a direction opposite to the direction of ladder cord advance, said non-active cross-rung being positioned, with respect to the direction of said advance, upstream of said active cross-rung, and means for guiding said slat material for insertion between and through the individual cords of the active cross-rung to form an interlaced slat, wherein the improvement comprises:

means on said body portion capable of and positioned close to the plane through which said ladder cord advances to abuttingly engage with the bottom surface of a slat readily interlaced in the cross-rung directly preceeding said active cross-rung for supporting this slat downstream of said active cross-rung with respect to the direction of said advance, thereby holding the active cross-rung in a substantially fixed predetermined position between said urging means and said supporting means such that a force provided by said urging means and exerted onto said non-active cross-rung maximally and accurately spreads apart the individual cords of said active cross-rung.

2. The invention in claim 1 wherein said suporting means is substantially in the form of a parallelogram.

3. The invention in claim 2 wherein said supporting means is further comprised of upper and lower cross-members which are situated on two opposing sides of the parallelogram, and two resiliently moveable arms which join said cross-members and are oppositely situated on the remaining two sides of the parallelogram, wherein said lower cross-member is comprised of an abutment surface that abuttingly engages with said interlaced slat, and said upper cross-member is attached to a fixed member.

4. The invention in claim 3 in which said supporting means is further comprised of means for adjusting the height of said abutment surface relative to a point at which supporting means is attached to the fixed member.

5. In a unit for guiding and supporting assembled venetian blind slats and forming part of a machine for assembling consecutive venetian blind slats in a ladder cord or the like, said unit comprising:

means for guiding and holding the slats in position during and after their assembly, means, positioned in partial overlap with a path of advance of an assembled slat, for supporting the assembled slat and comprising an operational part having an inclined surface for engaging the assembled slat and an abutment surface situated above said inclined surface for abuttingly engaging with and supporting said assembled slat, and means for resiliently holding said operational part in the overlapping position and returning it thereto after said abutment surface abuttingly engages with and is forced aside by the assembled slat, wherein said holding means is comprised of two resilient arms each of which is affixed at one of its ends to said operational part and at the other end to a fixing member that holds these other ends in a substantially fixed position.

6. The invention in claim 5 in which said supporting means is further comprised of retaining means which abuttingly engages with said fixed member so as to prevent excess inward movement of the supporting means towards said ladder cord.

7. The invention in claim 5 in which said adjusting means is comprised of a vernier adjustment for providing a fine adjustment of said height.

8. The invention in claim 5 in which said supporting means is further comprised of a guiding edge which abuttingly engages with the fixed member so as to maintain the abutment surface in an orientation which is substantially perpendicular to the ladder cord as the height of the abutment surface is adjusted.

9. The invention in claim 5 wherein said supporting means is substantially in the form of a quadrangle.

10. The invention in claim 9 wherein said supporting means is further comprised of upper and lower cross-members, which are situated on two opposing sides of the quadrangle, and two resiliently moveable arms which join said cross-members and are oppositely situated on the remaining two sides of the quadrangle, wherein the lower cross-member is comprised of said operational part and the upper cross-member is attached to a fixed member.

11. The invention in claim 10 wherein the supporting means are substantially in the form of a rectangle.

12. The invention in claim 5 wherein the operational part, said resilient arms, and said fixed member are integrally formed.

13. A slat supporting member for use in a venetian blind assembling machine comprising:

means for guiding and holding a slat in position during and after its assembly, means positioned in partial overlap with a path of advance of an assembled slat, for supporting said assembled slat and comprising an operational part having an inclined surface for engaging the assembled slat and an abutment surface situated above said inclined surface for abuttingly engaging with and supporting said assembled slat, and means for resiliently holding said operational part in the overlapping position and returning it thereto after said abutment surface abuttingly engages with and is forced aside by the assembled slat, wherein said holding means is comprised of two resilient arms each of which is affixed at one of its ends to said operational part and at the other end to a member that holds these other ends in a substantially fixed position.

14. The invention in claim 13 wherein said supporting means is substantially in the form of a quadrangle.

15. The invention in claim 14 wherein said supporting means is further comprised of upper and lower cross-members, which are situated on two opposing sided of the quadrangle, and two resiliently moveable arms which join said cross-members and are oppositely situated on the remaining two sides of the quadrangle, wherein said lower cross-member is comprised of said operational part and said upper cross-member is comprised of a fixed member.

16. The invention in claim 15 wherein the supporting means are substantially in the form of a rectangle.

17. The invention in claim 15 wherein the operational part, said resilient arms, and said fixing member are integrally formed.

* * * * *

UNITED STATES PATENT AND TRADEMARK OFFICE
CERTIFICATE OF CORRECTION

PATENT NO. : 4,543,699
DATED : October 1, 1985
INVENTOR(S) : Richard N. Anderson It is certified that error appears in the above-identified patent and that said Letters Patent is hereby corrected as shown below:

Front Page, Col. 1, line 5, delete "Assignee: Hunter Douglas Industries B.V., Rotterdam, Netherlands" and substitute therefor --Assignee: Hunter Douglas, Inc., Totouea, N.J. --

Signed and Sealed this

*Fifteenth* Day of *July 1986*

[SEAL]

*Attest:*

DONALD J. QUIGG

*Attesting Officer* *Commissioner of Patents and Trademarks*